(12) United States Patent
Schepperle

(10) Patent No.: US 10,024,396 B2
(45) Date of Patent: Jul. 17, 2018

(54) DUAL CLUTCH TRANSMISSION FOR A MOTOR VEHICLE

(71) Applicant: ZF Friedrichshafen AG, Friedrichshafen (DE)

(72) Inventor: Bernd Schepperle, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 304 days.

(21) Appl. No.: 14/934,287

(22) Filed: Nov. 6, 2015

(65) Prior Publication Data
US 2016/0131224 A1   May 12, 2016

(30) Foreign Application Priority Data
Nov. 7, 2014   (DE) .......................... 10 2014 222 820

(51) Int. Cl.
*F16H 3/08*   (2006.01)
*F16H 3/097*   (2006.01)
(Continued)

(52) U.S. Cl.
CPC ............. *F16H 3/097* (2013.01); *F16H 3/006* (2013.01); *F16H 2003/0933* (2013.01); *F16H 2200/006* (2013.01); *F16H 2200/0086* (2013.01)

(58) Field of Classification Search
CPC .................. F16H 37/021; F16H 2003/0931
(Continued)

(56) References Cited

U.S. PATENT DOCUMENTS

| 4,463,621 A | 8/1984 | Fisher |
| 5,125,282 A | 6/1992 | Bender et al. |

(Continued)

FOREIGN PATENT DOCUMENTS

| DE | 39 26 570 A1 | 2/1991 |
| DE | 199 39 819 C1 | 11/2000 |

(Continued)

OTHER PUBLICATIONS

German Search Report Corresponding to 10 2014 222 820.4 dated Nov. 17, 2015.
(Continued)

*Primary Examiner* — Ha Dinh Ho
(74) *Attorney, Agent, or Firm* — Davis & Bujold PLLC; Michael J. Bujold

(57) ABSTRACT

A dual-clutch transmission has first and second coaxial input shafts, with the second shaft extending through the first shaft. The input shafts can couple respective countershafts via input constants. The first countershaft has two sections rigidly connected by a first shifting element. Four gear stages implement forward gears and one gear stage implements reverse gears. The fourth gear stage is arranged between the first section and an output shaft. The second and third gear stages are arranged between the second section and the output shaft. The first and the reversing gear stages are arranged between the second countershaft and the output shaft. The first input constant has a loose wheel supported on the second countershaft and can be rotationally fixed, by a second shifting element, to the first section of the first countershaft. The second section can be rotationally fixed, via a third shifting element, to the second countershaft.

9 Claims, 6 Drawing Sheets

(51) Int. Cl.
*F16H 3/00* (2006.01)
*F16H 3/093* (2006.01)

(58) Field of Classification Search
USPC .................................. 74/330, 331, 333, 340
See application file for complete search history.

(56) References Cited

U.S. PATENT DOCUMENTS

| | | | |
|---|---|---|---|
| 7,231,843 B2* | 6/2007 | Gumpoltsberger | F16H 3/006 74/329 |
| 7,377,191 B2* | 5/2008 | Gitt | F16H 3/006 74/330 |
| 7,409,886 B2 | 8/2008 | Gitt | |
| 7,437,964 B2 | 10/2008 | Gitt | |
| 8,051,732 B2* | 11/2011 | Gitt | F16H 3/006 74/330 |
| 8,408,084 B2* | 4/2013 | Gitt | F16H 37/046 74/330 |
| 8,485,055 B2* | 7/2013 | Gumpoltsbeger | F16H 3/006 74/330 |

FOREIGN PATENT DOCUMENTS

| | | |
|---|---|---|
| DE | 103 32 210 A1 | 2/2005 |
| DE | 103 35 262 A1 | 3/2005 |
| DE | 10 2013 213 157 A1 | 1/2015 |

OTHER PUBLICATIONS

German Search Report Corresponding to 10 2014 222 821.2 dated Nov. 17, 2015.

\* cited by examiner

| Gear | K1 | K2 | A | B | C | D | E | L | M | N | O | i | φ |
|---|---|---|---|---|---|---|---|---|---|---|---|---|---|
| G1 | X | — | X | — | — | — | — | X | X | X | — | 8,54 | |
| G2 | — | X | X | — | — | — | — | — | — | — | — | 5,26 | 1,63 |
| G3 | X | — | — | X | — | — | — | X | X | — | — | 3,22 | 1,63 |
| G4 | — | X | — | X | — | — | — | — | — | X | — | 1,98 | 1,63 |
| G5 | X | — | — | — | X | — | — | — | X | — | — | 1,39 | 1,42 |
| G6 | — | X | — | — | X | — | — | — | — | X | — | 1,18 | 1,18 |
| G7 | X | — | — | — | — | — | — | — | — | — | X | 1,00 | 1,18 |
| G8 | — | X | — | — | — | X | — | X | — | X | — | 0,86 | 1,17 |
| R1 | X | — | — | — | — | — | X | X | X | X | — | -8,19 | |
| R2 | — | X | — | — | — | X | — | — | — | — | — | -5,04 | 1,63 |

$i_{E1} = 2{,}73 \quad i_{E2} = 1{,}68 \quad i_{Z1} = 3{,}13 \quad i_{Z2} = 1{,}18 \quad i_{Z3} = 0{,}70 \quad i_{Z4} = 0{,}51 \quad i_{ZR} = -3{,}00$

DUAL CLUTCH TRANSMISSION FOR A MOTOR VEHICLE

This application claims priority from German patent application serial no. 10 2014 222 820.4 filed Nov. 7, 2014.

FIELD OF THE INVENTION

The invention concerns a dual-clutch transmission.

BACKGROUND OF THE INVENTION

In a front longitudinal configuration of a drive unit consisting of a drive engine and a transmission in a motor vehicle, the output shaft of the transmission is preferably arranged in a common geometrical axis with the input shaft or input shafts of the transmission. In the case of a dual-clutch transmission with a centrally arranged first input shaft and a second input shaft in the form of a hollow shaft fitted coaxially over the first input shaft, the coaxial arrangement of the output shaft required for this can be achieved if, by way of a respective input constant in each case, the input shafts are or can be brought into driving connection with an associated countershaft. To engage the gears, the countershafts can each be brought into driving connection with the output shaft by means of a number of spur gear stages, each of which can respectively be engaged by means of a gearshifting element. Furthermore, with this arrangement a direct gear can usually be engaged by connecting the first input shaft to the output shaft in a rotationally fixed manner.

In a generally known first basic design of a dual-clutch transmission of this type, the countershafts are arranged axis-parallel with and a distance away from one another and from the output shaft. In an embodiment of such a dual-clutch transmission known from U.S. Pat. No. 4,463,621 A, the shiftable spur gear stages are arranged in various gearwheel planes. The loose wheels of the spur gear stages are in each case mounted to rotate on the output shaft and can be connected in a rotationally fixed manner to the output shaft by means of the associated gearshifting elements. By virtue of a coupling shifting element arranged between the central, first input shaft and the output shaft, a direct gear can be engaged. For four forward gears and one reverse gear, this known dual-clutch transmission requires a total of six gearwheel planes.

In contrast to this, in a dual-clutch transmission known from DE 103 35 262 A1 there are five spur gear stages and one reversing spur gear stage, each using a common fixed wheel or loose wheel arranged on the output shaft in pairs in common gearwheel planes. The two outer gearwheels of the reversing spur gear stage are loose wheels, whereby two of three possible reverse gears can be engaged as winding gears. For seven forward gears and three reversing gears this known dual-clutch transmission has a total of seven gearwheel planes, In a generally known second basic embodiment of such a dual-clutch transmission the second countershaft associated with the second input shaft is arranged axis-parallel with and a distance away from the output shaft, and the first countershaft associated with the first input shaft is in the form of a hollow shaft arranged coaxially over the second countershaft.

In the dual-clutch transmission of this type known from DE 199 39 819 C1 the shiftable spur gear stages are arranged in different gearwheel planes. The loose wheels of the spur gear stages are in each case mounted to rotate on the output shaft and can be connected rotationally fixed thereto by the associated gearshift elements. By means of a coupling shifting element arranged between the centrally positioned first input shaft and the output shaft, a direct gear can be engaged. For six forward gears and one reverse gear this known dual-clutch transmission needs a total of eight gearwheel planes.

In contrast, in a further embodiment of a dual-clutch transmission of this type known from DE 103 32 210 A1 the drive output wheel of the first input constant associated with the first input shaft is in the form of a loose wheel, which is mounted to rotate on the first countershaft and can be connected thereto in a rotationally fixed manner by means of a first coupling shifting element. In addition the first countershaft can be connected in a rotationally fixed manner to the second countershaft by means of a second coupling shifting element. By means of the two coupling shifting elements the spur gear stages arranged between the first countershaft and the output shaft can be alternately brought into driving connection with the first or second input constant and thus used, in each case, for the engagement of two gears. For six forward gears and one reverse gear this known dual-clutch transmission has a total of six gearwheel planes.

SUMMARY OF THE INVENTION

The purpose of the present invention is to propose a dual-clutch transmission of the type mentioned to begin with, which corresponds to the second basic embodiment, which has compact dimensions and provides at least seven forward gears and a reverse gear. In sequential shifts the forward gears should be powershiftable and at least in the middle or higher gears the gear gradation should be progressive.

This objective is achieved with a dual-clutch transmission having the characteristics and advantageous developments as discussed below.

Accordingly the invention starts with a dual-clutch transmission for a motor vehicle, having a centrally arranged first input shaft and a second input shaft in the form of a hollow shaft arranged coaxially over the first input shaft, in which on their drive input side the two input shafts can be connected each by way of a respective friction clutch to the driveshaft of a drive engine, in which on their transmission side the two input shafts are or can be brought into driving connection with a respective countershaft by way of input constants in each case comprising a drive input wheel and a drive output wheel, in which the countershafts can each be brought into driving connection, selectively by way of a number of spur gear stages that can in each case be shifted by means of a respective gearshifting element, with an output shaft arranged coaxially with and axially adjacent to the first input shaft, and in which the first countershaft is in the form of a hollow shaft and is positioned coaxially over the second countershaft.

According to the invention, in this dual-clutch transmission it is also provided as follows: that the first countershaft is divided into a first section axially on the drive input side and a second section axially on the drive output side, which can be connected to one another in a rotationally fixed manner by means of a first coupling shifting element, that there are four spur gear stages for engaging forward gears, whose gear ratios decrease with increasing order number, and a reversing spur gear stage for engaging reverse gears, and that the fourth spur gear stage is arranged between the first section of the first countershaft and the output shaft, the second and third spur gear stages are arranged between the second section of the first countershaft and the output shaft, the first spur gear stage and the reversing spur gear stage are arranged between the second countershaft and the output shaft, the first input constant has a higher gear ratio compared with the second input constant, the drive output wheel of the first input constant is a loose wheel which is mounted to rotate on the second countershaft and can be connected in a rotationally fixed manner to the first section of the first countershaft by means of a second coupling shifting element, and there is a third coupling shifting element by means of which the second section of the first countershaft can be connected in a rotationally fixed manner to the second countershaft.

By virtue of this configuration of the dual-clutch transmission the existing spur gear stages and the reversing spur gear stage can be brought selectively into driving connection with the two input constants, and thus engaged both by way of the first friction clutch and the first input shaft and by way of the second friction clutch and the second input shaft.

For this purpose, on the one hand, the first countershaft is divided into a first section axially on the drive input side and a second section axially on the drive output side, which sections can be connected in a rotationally fixed manner to one another by means of a first coupling shifting element. On the other hand, the drive output wheel of the first input constant, in the form of a loose wheel, can be connected in a rotationally fixed manner by the second coupling shifting element to the first section of the first countershaft and the second section of the first countershaft can be connected in a rotationally fixed manner by the third coupling shifting element to the second countershaft. Thus, the four spur gear stages and the reversing spur gear stage can be brought into driving connection with each of the two input constants, so that eight forward gears and two reverse gears can be engaged. In the present case, however, a theoretically possible gear that could be engaged by closing the first friction clutch and engaging the first and second coupling shifting elements and the gear shifting element of the third spur gear stage, is not used because of a gear ratio overlap. All the forward gears, on shifting from gear n to gear n+1 or to gear n−1, can be powershifted. Likewise, the two reverse gears can be powershifted.

To enable the desired progressive gear gradation in the middle or higher gears, the two input constants have a gear ratio gradation ($i_{E1}/i_{E2}$) of such value, and the first four spur gear stages have a progressive gear ratio gradation ($i_{Z1}/i_{Z2} > i_{Z2}/i_{Z3} > i_{Z3}/i_{Z4}$) such that the first four gears are engaged in alternation in a force flow by way of the first or second input constants and in pairs successively by way of the first or second spur gear stage, the fifth gear is engaged in a force flow by way of the first input constant and the fourth spur gear stage, the sixth gear is engaged in a force flow by way of the second input constant and the third spur gear stage, and the highest gear is engaged in a force flow by way of the second input constant and the fourth spur gear stage.

In a first embodiment variant of the dual-clutch transmission according to the invention, the gear ratios ($i_{E1}$, $i_{E2}$, $i_{Z1}$–$i_{Z4}$) of the two input constants and the first four spur gear stages are chosen such that there is a largely geometric gear gradation between the first and the fourth gear, and such that there is a largely progressive gear gradation ($i_{G3}/i_{G4} > i_{G4}/i_{G5} > i_{G5}/i_{G6}$) between the third gear and the sixth gear, and between the fifth gear and the highest gear there is again a largely geometric gear gradation ($i_{Gn}/i_{Gn+1}$=constant).

In a second embodiment variant of the dual-clutch according to the invention, the gear ratios of the input constants and of the first four spur gear stages are chosen such that there is a largely geometric gear gradation ($i_{Gn}/i_{Gn+1}$=constant) between the first gear and the fourth gear, and there is a largely progressive gear gradation ($i_{Gn} > i_{Gn+1} > i_{Gn+2}$) between the third gear and the highest gear.

To make the shift between the sixth and seventh gears powershiftable, it is provided that the first input shaft can be connected in a rotationally fixed manner to the output shaft by means of a fourth coupling shifting element, whereby the dual-clutch transmission is extended by a shiftable direct gear associated with the first friction clutch and the first input shaft.

Since the direct gear is sequenced as the seventh gear between the sixth gear and the highest gear (the eighth gear), the gear ratios of the input constants and the first four spur gear stages are chosen such that the direct gear (the seventh gear) that can be engaged by means of the fourth coupling shifting element has a lower gear ratio than the sixth gear and a higher gear ratio than the highest gear (the eighth gear), and is sequenced as the seventh gear between the sixth gear and the highest gear (the eighth gear) with largely geometric gear gradation ($i_{G6}/i_{G7}=i_{G7}/i_{G8}$) or with largely progressive gear gradation ($i_{G6}/i_{G7} > i_{G7}/i_{G8}$).

The second spur gear stage and the third spur gear stage can be arranged in any axial sequence between the second section of the first countershaft and the output shaft. Likewise, the loose wheels of the second spur gear stage and the third spur gear stage as such can be arranged anywhere on the second section of the first countershaft. To save a shift actuator, however, it is advantageous for the loose wheels of the second and third spur gear stages to be arranged together and adjacent to the output shaft or the second section of the first countershaft, since the gear shifting elements of the second and third spur gear stages can be combined in a double shifting element.

Likewise, the first spur gear stage and the reversing spur gear stage can be arranged axially in any sequence between the second countershaft and the output shaft. Moreover, the loose wheels of the first spur gear stage and the reversing spur gear stage can be arranged in any way on the second countershaft or the output shaft. Preferably, however, the loose wheels of the first spur gear stage and the reversing spur gear stage are arranged together and adjacent to the output shaft or the second countershaft, because the gear shifting elements of these spur gear stages can thereby also be advantageously combined in a double shifting element.

BRIEF DESCRIPTION OF THE DRAWINGS

For the further clarification of the invention the description is attached, of a drawing with a number of example embodiments, which show:

FIG. 6b: The variation of the gear gradation of the dual-clutch transmission according to FIGS. 1 and 2a or according to FIGS. 3 and 4a, resulting from the second gear ratios according to FIG. 6a.

DETAILED DESCRIPTION OF THE PREFERRED EMBODIMENTS

Figure 1:
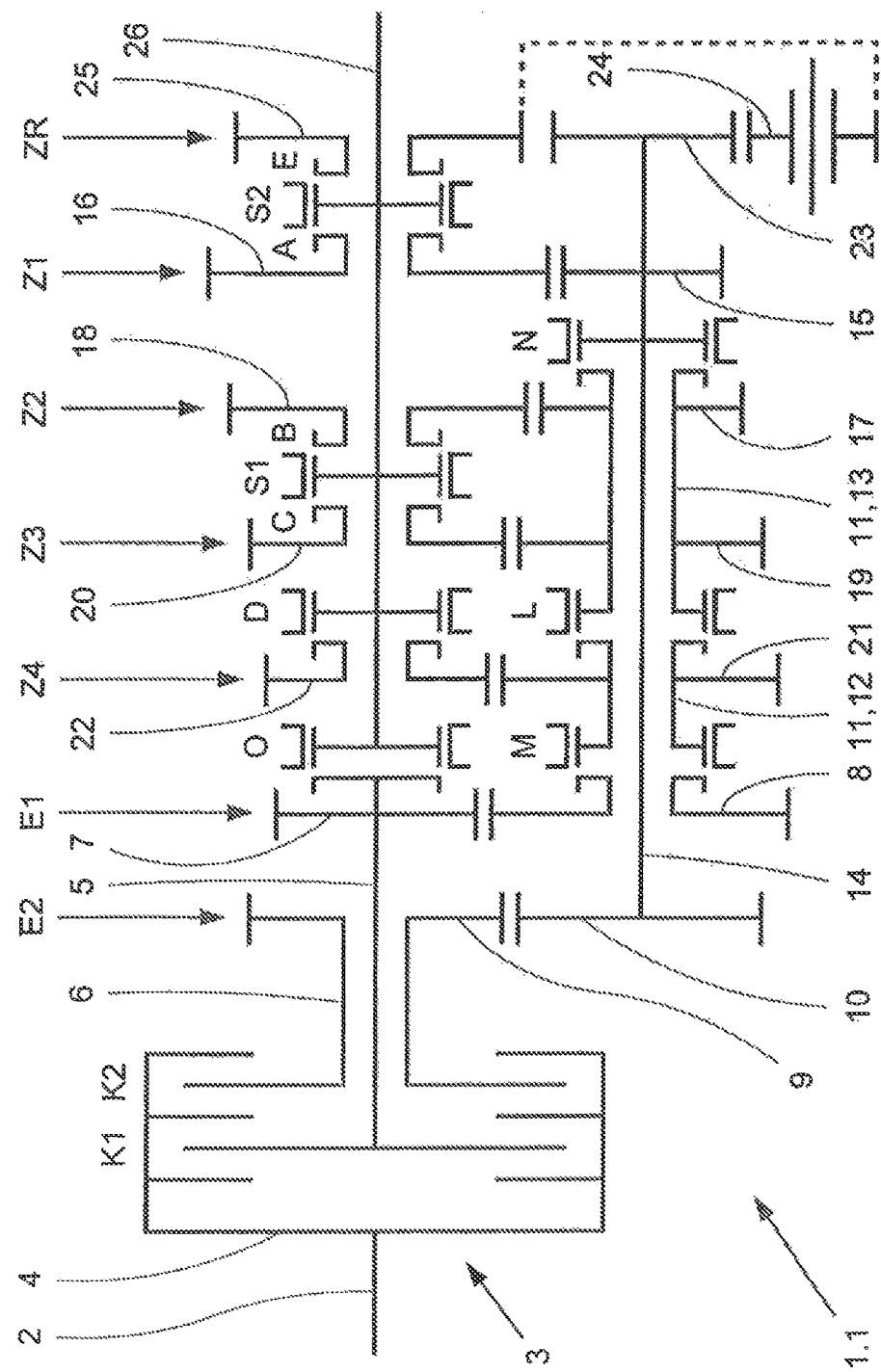
FIG. 1: A first embodiment of a dual-clutch transmission designed according to the invention, shown as a schematic side view.

A first embodiment of the dual-clutch transmission 1.1 designed according to the invention, which is illustrated in FIG. 1 as a schematic side view, comprises a centrally arranged first input shaft 5 and a second input shaft 6 in the form of a hollow shaft arranged coaxially over the first input shaft 5. On the drive input side, the two input shafts 5, 6 can be connected each by a respective friction clutch K1 K2 to the driveshaft 2 of a drive engine (not shown), for example in the form of an internal combustion engine. The friction clutches K1, K2 are part of a dual-clutch assembly 3, which has a clutch cage 4 connected to the driveshaft 2 of the drive engine in a rotationally fixed manner.

On the transmission side, the two input shafts 5, 6 are or can be brought into driving connection by way of respective input constants E1, E2 each comprising a drive input wheel 7, 9 and a drive output wheel 8, 10, with respective countershafts 11, 14. The two countershafts 11, 14 can in each case be brought into driving connection by way of a number of spur gear stages Z1, Z2, Z3, Z4, ZR, each respectively engaged by a gear shifting element A, B, C, D, E, with an output shaft 26, which is arranged coaxially with and axially adjacent to the first input shaft 5. The first countershaft 11 is in the form of a hollow shaft and is arranged coaxially over the second countershaft 14, and is divided into a first section 12 axially on the drive input side and a second section 13 axially on the drive output side, which sections can be connected rotationally fixed to one another by means of a first coupling shifting element L.

To engage eight forward gears G1, G2, G3, G4, G5, G6, G7, G8, four spur gear stages Z1, Z2, Z3, Z4 are provided, whose gear ratios $i_{Z1}$, $i_{Z2}$, $i_{Z3}$, $i_{Z4}$ decrease with increasing order number ($i_{Z1} > i_{Z2} > i_{Z3} > i_{Z4}$). To engage two reverse gears R1, R2 a reversing spur gear stage ZR is provided. The spur gear stages Z1, Z2, Z3, Z4 and the reversing spur gear stage ZR each comprise a respective fixed wheel 15, 17, 19, 21, 23 and in each case a loose wheel 16, 18, 20, 22, 25. To reverse the rotational direction the reversing spur gear stage ZR additionally has an intermediate wheel 24.

The fourth spur gear stage Z4 is arranged between the first section 12 of the first countershaft 11 and the output shaft 26. The second spur gear stage Z2 and the third spur gear stage Z3 are arranged between the second section 13 of the first countershaft 11 and the output shaft 26. The first spur gear stage Z1 and the reversing spur gear stage ZR are arranged between the second countershaft 14 and the output shaft 26.

Compared with the second input constant E2, the first input constant E1 has a higher gear ratio ($i_{E1} > i_{E2}$). The drive input wheel 7 of the first input constant E1 is a fixed wheel, attached in a rotationally fixed manner to the first input shaft 5. The drive output wheel 8 of the first input constant E1 is a loose wheel, which is mounted to rotate on the second countershaft 14 and which can be connected in a rotationally fixed manner to the first section 12 of the first countershaft 11 by means of a second coupling shifting element M. The drive input wheel 9 of the second input constant E2 is also a fixed wheel attached in a rotationally fixed manner on the second input shaft 6. The drive output wheel 10 of the second input constant E2 is also a fixed wheel attached in a rotationally fixed manner on the second countershaft 14.

The fourth spur gear stage Z4 is arranged axially adjacent to the first input constant E1. The fixed wheel 21 of the fourth spur gear stage Z4 is attached rotationally fixed on the first section 12 of the first countershaft 11. The second spur gear stage Z2 and the third spur gear stage Z3 are arranged on the drive output side axially adjacent to the fourth spur gear stage Z4, so that in this case the third spur gear stage is positioned axially between the second spur gear stage Z2 and the fourth spur gear stage Z4. The fixed wheels 17, 19 of the second and third spur gear stages Z2, Z3 are attached rotationally fixed on the second section 13 of the first countershaft 11. The loose wheels 18, 20, 22 of these three spur gear stages Z2, Z3, Z4 are in each case mounted to rotate on the output shaft 26 and can be connected thereto in a rotationally fixed manner by means of associated gear shifting elements B, C, D. The gear shifting elements B, C of the second and third spur gear stages Z2 and Z3 are combined in a first double shifting element S1.

On the side of the first countershaft 11 facing away from the dual-clutch transmission 3 is arranged a third coupling shifting element N, by means of which the second section 13 of the first countershaft 11 can be connected rotationally fixed to the second countershaft 14.

The first spur gear stage Z1 is arranged axially between the second spur gear stage Z2 and the reversing spur gear stage ZR. The fixed wheels 15, 23 of the first spur gear stage Z1 and the reversing spur gear stage ZR are attached rotationally fixed on the second countershaft 14. The loose wheels of these two spur gear stages Z1, ZR are mounted to rotate on the output shaft 26 and can be attached rotationally fixed thereto by means of associated gear shifting elements A, E. The two gear shifting elements A, E of the first spur gear stage Z1 and of the reversing spur gear stage ZR are combined in a second double shifting element S2.

By means of a fourth coupling shifting element O, the first input shaft 5 can be connected in a rotationally fixed manner directly to the output shaft 26 to form a direct gear.

Since the gears G1, G2, G3, G4, G5, G6, G7, G8 can be engaged by way of the four spur gear stages Z1, Z2, Z3, Z4 in increasing sequence alternately by means of the friction clutches K1, K2, and in the middle or higher gears there is a progressive gear gradation, the two input constants E1, E2 have a transmission ratio gradation $i_{E1}/i_{E2}$ of such a value, and the spur gear stages Z1, Z2, Z3, Z4 a transmission ratio gradation ($i_{Z1}/i_{Z2} > i_{Z2}/i_{Z3} > i_{Z3}/i_{Z4}$) which is progressive in such manner that the first four gears G1, G2, G3, G4 are engaged alternately in a force flow by way of the first input constant E1 or the second input constant E2 and in pairs successively by way of the first spur gear stage Z1 or the second spur gear stage Z2, the fifth gear G5 is engaged in a force flow by way of the first input constant E1 and the fourth spur gear stage Z4, the sixth gear G6 is engaged in a force flow by way of the second input constant E2 and the third spur gear stage Z3, and the highest gear G8 is engaged in a force flow by way of the second input constant E2 and the fourth spur gear stage Z4, whereas the direct gear that can be engaged by means of the fourth coupling shifting element O as the seventh gear G7, is correspondingly sequenced between the sixth gear G6 and the highest (or eighth) gear G8.

Figure 2A:
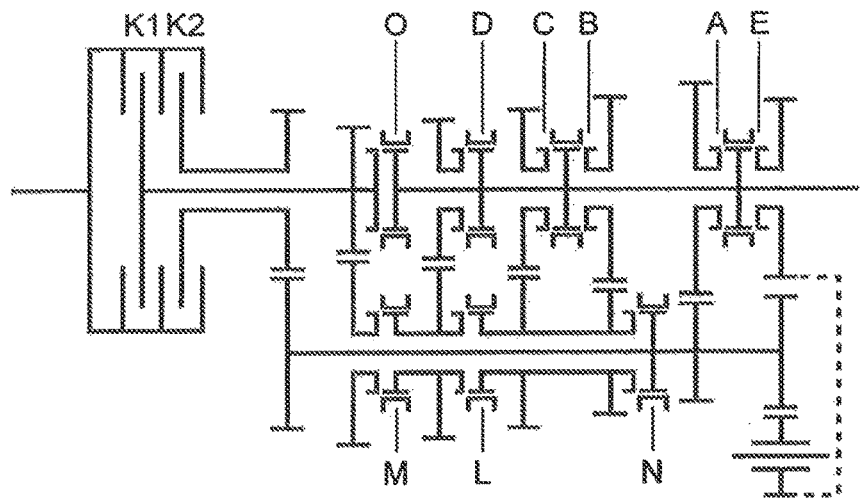
FIG. 2a: The dual-clutch transmission of FIG. 1, shown in a side view on a smaller scale.
Figure 2B:
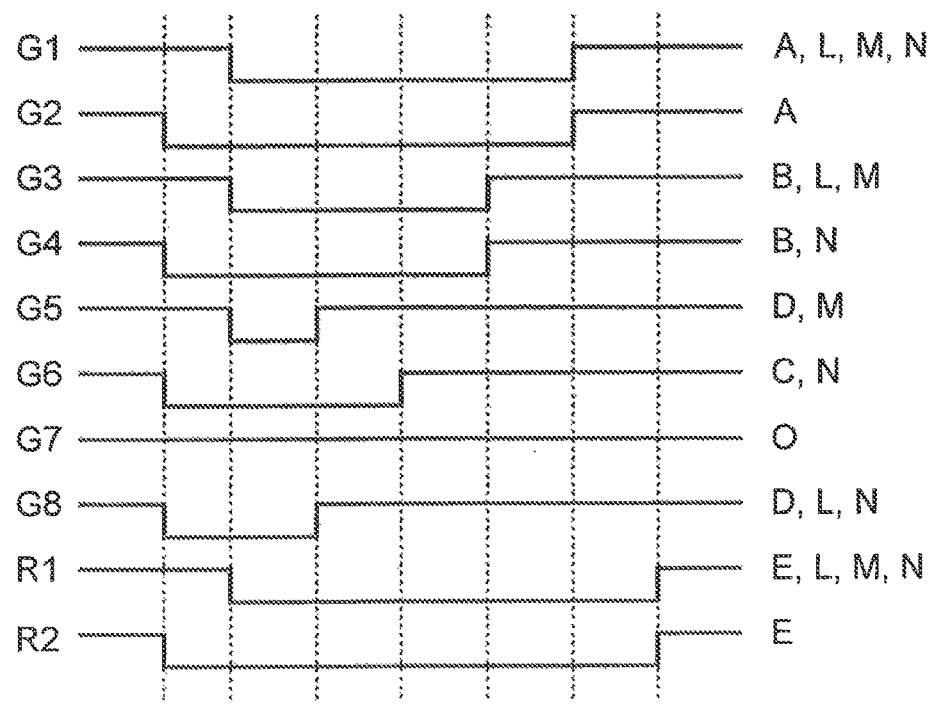
FIG. 2b: A force flow diagram of the dual-clutch transmission according to FIG. 2a, FIG. 3: A second embodiment of a dual-clutch transmission designed according to the invention, shown as a schematic side view.

As FIGS. 2a and 2b also make clear for purposes of support, when the first gear G1 is engaged, the first friction clutch K1 is closed and the first, second and third coupling shifting elements L, M, N and the gear shifting element A of the first spur gear stage Z1 are engaged, and the force flow passes from the driveshaft 2 of the drive engine, via the first input shaft 5, the first input constant E1, the first section 12 of the first countershaft 11, the second section 13 of the first countershaft 11, the second countershaft 14 and the first spur gear stage Z1, to the output shaft 26.

When the second gear G2 is engaged, and when the second friction clutch K2 is closed and the gear shifting element A of the first spur gear stage Z1 is engaged, the force flow passes from the driveshaft 2 of the drive engine, via the second input shaft 6, the second input constant E2, the second countershaft 14 and the first spur gear stage Z1, to the output shaft 26.

In the third gear G3, which is engaged by engaging the first and second coupling shifting elements L, M and the gear shifting element B of the second spur gear stage Z2, when the first friction clutch K1 is closed the force flow passes from the driveshaft 2 of the drive engine, via the first input shaft 5, the first input constant E1, the first section 12 of the first countershaft 11, the second section 13 of the first countershaft 11 and the second spur gear stage Z2, to the output shaft 26.

In the fourth gear G4, which is engaged by engaging the third coupling shifting element N and the gear shifting element B of the second spur gear stage Z2, when the second friction clutch K2 is closed the force flow passes from the driveshaft 2 of the drive engine via the second input shaft 6, the second input constant E2, the second countershaft 14, the second section 13 of the first countershaft 11 and the second spur gear stage Z2, to the output shaft 26.

The fifth gear G5 is engaged by engaging the second coupling shifting element M and the gear shifting element D of the fourth spur gear stage Z4. Thus, in the fifth gear G5, when the first friction clutch K1 is closed the force flow passes from the driveshaft 2 of the drive engine, via the first input shaft 5, the first input constant E1, the first section 12 of the first countershaft 11 and the fourth spur gear stage Z4, to the output shaft 26.

When the sixth gear G6 is engaged, with the second friction clutch K2 closed and the third coupling shifting element N and the gear shifting element C of the third spur gear stage Z3 engaged, the force flow passes from the driveshaft 2 of the drive engine via the second input shaft 6, the second input constant E2, the second countershaft 14, the second section 13 of the first countershaft 11 and the third spur gear stage Z3, to the output shaft 26.

As the seventh gear, the direct gear that can be engaged by means of the fourth coupling shifting element O is used. Accordingly, in the seventh gear G7, when the first friction clutch K1 is closed the force flow passes from the driveshaft 2 of the drive engine, via the first input shaft 5, directly to the output shaft 26.

In the eighth gear G8, which is engaged by engaging the first and third coupling shifting elements L, N and the gear shifting element D of the fourth spur gear stage Z4, when the second friction clutch K2 is closed the force flow passes from the driveshaft 2 of the drive engine, via the second input shaft 6, the second input constant E2, the second countershaft 14, the second section 13 of the first countershaft 11, the first section 12 of the first countershaft 11 and the fourth spur gear stage Z4, to the output shaft 26.

When the first reverse gear R1 is engaged, with the first friction clutch K1 closed and the first, second and third coupling shifting elements L, M, N and the gear shifting element E of the reversing spur gear stage ZR engaged, the force flow passes from the driveshaft 2 of the drive engine, via the first input shaft 5, the first input constant E1, the first section 12 of the first countershaft 11, the second section of the first countershaft 11, the second countershaft 14 and the reversing spur gear stage ZR, to the output shaft 26.

When the second reverse gear R2 is engaged, with the second friction clutch K2 closed and the gear shifting element E of the reversing spur gear stage ZR engaged, the force flow passes from the driveshaft 2 of the drive engine, via the second input shaft 6, the second input constant E2, the second countershaft 14 and the reversing spur gear stage ZR, to the output shaft 26.

Thus, the dual-clutch transmission 1.1 according to the invention, with a total of seven gearwheel planes, provides eight powershiftable forward gears G1, G2, G3, G4, G5, G6, G7, G8 and two powershiftable reverse gears R1, R2. In the middle or higher gears the gear gradation of the forward gears G1, G2, G3, G4, G5, G6, G7, G8 can be largely progressive, that is to say, to the accuracy that is possible within the scope of gearwheel technology, which in the gear range concerned suffices for a higher traction power during upshifts.

The above-described force flows in the gears G1-G8, R1, R2 concerned are shown in summary in the force flow scheme of FIG. 2b, which is preceded by FIG. 2a showing the schematic side view of the dual-clutch transmission 1.1 as in FIG. 1 but on a smaller scale, and whose indexing is limited to the friction clutches K1, K2 and the shifting elements A, B, C, D, E, L, M, N, a At the right-hand edge of the force-flow fines in FIG. 2b are shown the respective gear shifting elements and coupling shifting elements A, B, C, D, E, L, M, N, O engaged in each of the gears G1-G8, R1, R2.

Figure 3:
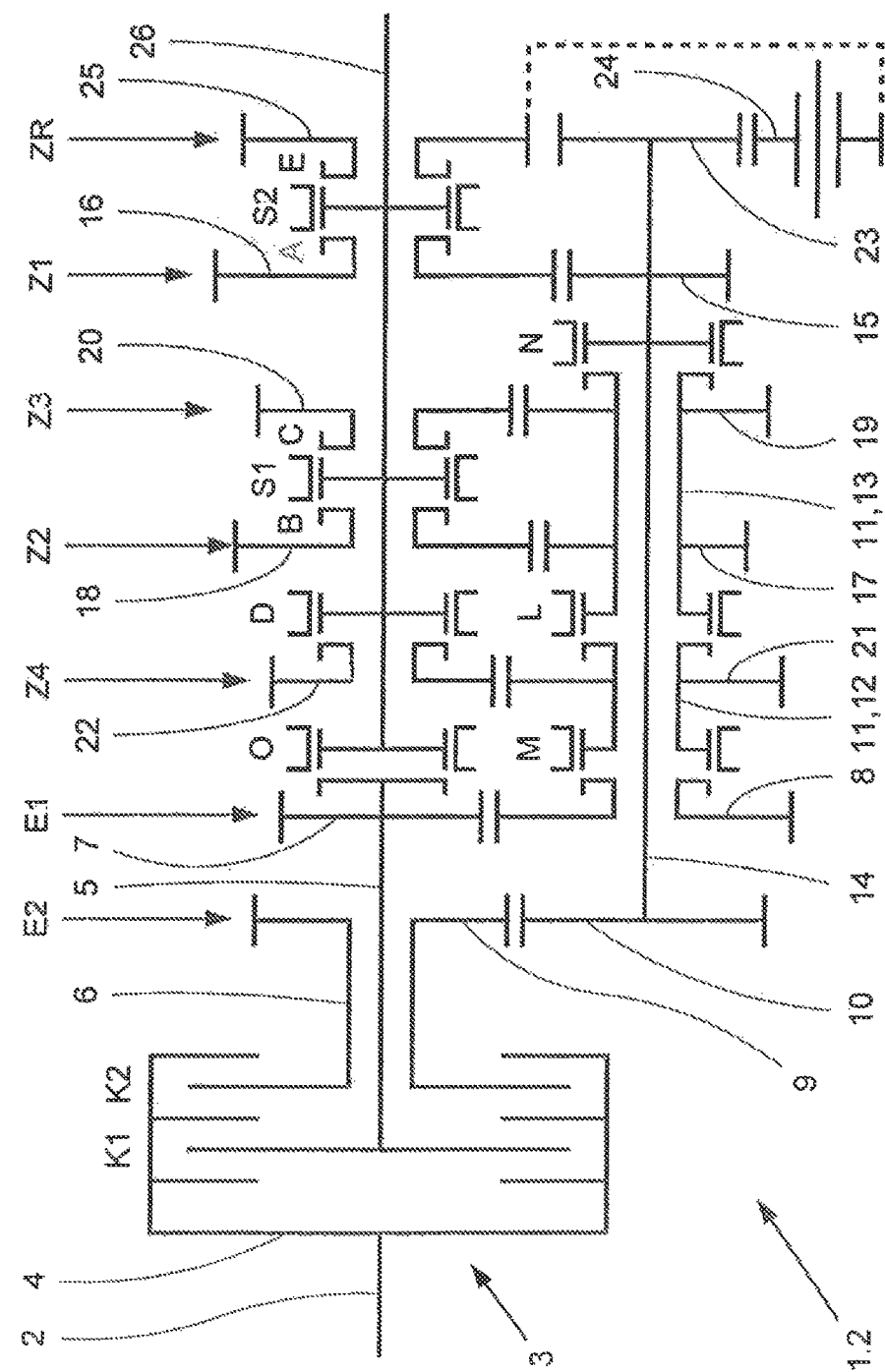

In FIG. 3 a second embodiment of a dual-clutch transmission 1.2 according to the invention, shown schematically in side view, differs from the first version of the dual-clutch transmission 1.1 according to FIG. 1 only in that the arrangement of the second spur gear stage Z2 and the third spur gear stage Z3 is axially interchanged. The engagement of the gears G1-G8, R1, R2 by means of the gear shifting elements A-E and the coupling shifting elements L-O is identical in both embodiments 1.1, 1.2 of the dual-clutch transmission.

Figure 4A:
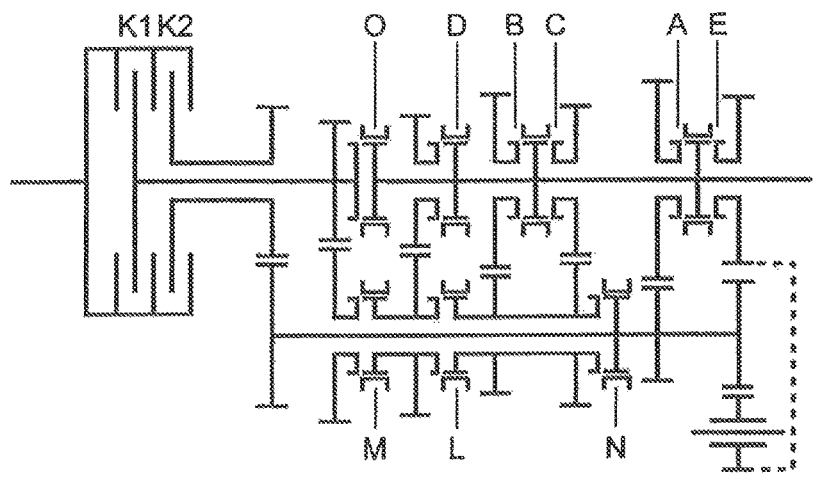
FIG. 4a: The dual-clutch transmission of FIG. 3, shown in a side view on a smaller scale.
Figure 4B:
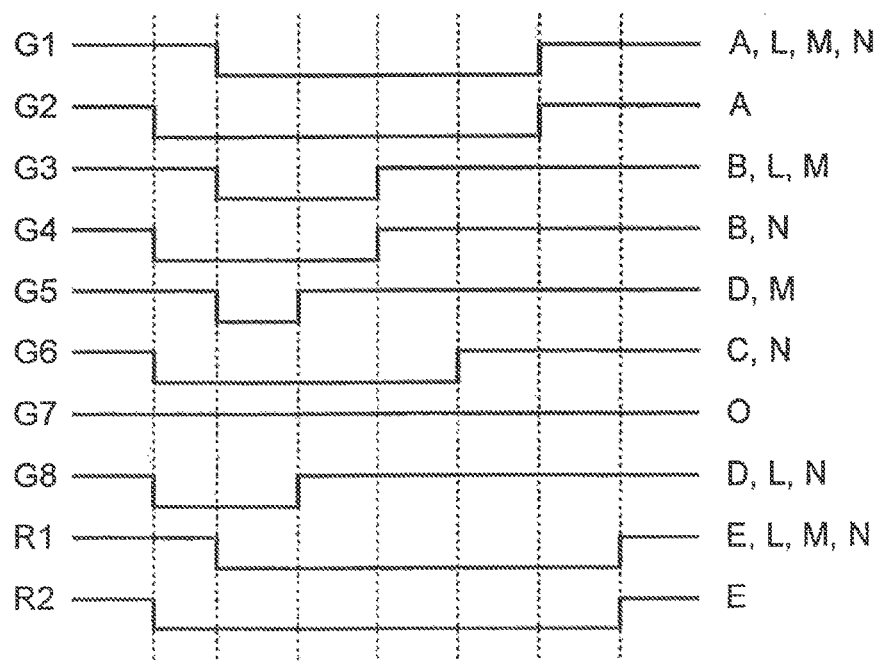
FIG. 4b: A force flow diagram of the dual-clutch transmission according to FIG. 4a, FIG. 5a: A shifting scheme of the dual-clutch transmission according to FIGS. 1 and 2a or according to FIGS. 3 and 4a, with example first gear ratios shown in the form of a table.

The corresponding force flows in the gears G1-G8, R1, R2 in the dual-clutch transmission 1.2 of FIG. 3 are summarized in the force-flow diagram of FIG. 4b, which is preceded by FIG. 4a showing the schematic side view of the dual-clutch transmission 1.2 as in FIG. 3 but on a smaller scale, and whose indexing is limited to the friction clutches K1, K2 and the shifting elements A-E, L-O. At the right-hand ends of the force-flow lines, again the respective gear shifting elements and coupling shifting elements A-E, L-O engaged in each of the gears G1-G8, R1, R2 are indicated.

Figures 5A, 5B:
FIG. 5b: The variation of the gear gradation of the dual-clutch transmission according to FIGS. 1 and 2a or according to FIGS. 3 and 4a, resulting from the first gear ratios according to FIG. 5a, FIG. 6a: A shifting scheme of the dual-clutch transmission according to FIGS. 1 and 2a or according to FIGS. 3 and 4a, with example second gear ratios shown in the form of a table.

The shifting scheme of the two embodiments 1.1, 1.2 of the dual-clutch transmission according to FIGS. 1 and 3 are summarized, with indicated examples of first gear transmission ratios i of the gears G1-G8, R1, R2 and of the gear intervals φ resulting therefrom, in the table shown in FIG. 5a. In the table, the closed condition of the friction clutches K1, K2 and the engaged condition of the gear shifting elements A-E and the coupling shifting elements L-O are indicated in each case by a cross. The transmission ratios $i_{E1}$, $i_{E2}$, $i_{Z1}$-$i_{Z4}$, $i_{ZR}$ of the input constants E1, E2, the spur gear stages Z1-Z4 and the reversing spur gear stage ZR, upon which the gear ratios i are based, are indicated in the line under the table of FIG. 5a.

As can be seen particularly clearly in the diagram shown in the next figure, FIG. 5b, in which the gear intervals φ are shown against the sequential shifting of the forward gears Gn/Gn+1 the dual-clutch transmissions 1.1, 1.2 with these first gear ratios i of the gears G1-G8, R1, R2 have between the first gear G1 and the fourth gear G4 a substantially geometric gear gradation ($i_{Gn}/i_{Gn+1}$=constant), between the third gear G3 and the sixth gear G6 a substantially progressive gear gradation ($i_{G3}/i_{G4}$>$i_{G4}/i_{G5}$>$i_{G5}/i_{G6}$), and between the fifth gear G5 and the eighth gear G8 again a substantially geometric gear gradation ($i_{Gn}/i_{Gn+1}$=constant).

Figures 6A, 6B:

With the indication of example second gear ratios i of the gears G1-G8, R1, R2 and the resulting gear intervals φ, the shifting scheme of the two versions of the dual-clutch transmission 1.1, 1.2 according to FIGS. 1 and 3 is summarized in the table shown in FIG. 6a. Analogously to the table of FIG. 5a, in FIG. 6a the closed condition of the friction clutches K1, K2 and the engaged condition of the gear shifting elements A-E and the coupling shifting elements L-O are indicated in each case by a cross. The transmission ratios $i_{E1}$, $i_{E2}$, $i_{Z1}$-$i_{Z4}$, $i_{ZR}$ of the input constants E1, E2, the spur gear stages Z1-Z4 and the reversing spur gear stage ZR, upon which the gear ratios i are based, are indicated in the line under the table of FIG. 6a.

In the diagram of FIG. 6b, constructed analogously to FIG. 5b, it can be seen clearly that the dual-clutch transmissions 1.1, 1.2, with these example second gear ratios i of the gears G1-G8, R1, R2, have between the first and fourth gears G1-G4 a substantially geometric gear gradation ($i_{Gn}/i_{Gn+1}$=constant), and between the third and eighth gears G3-G8 a substantially progressive gear gradation ($i_{Gn}/i_{Gn+1}$>$i_{Gn+1}/i_{Gn+2}$).

INDEXES 1.1 Dual-clutch transmission, first embodiment
1.2 Dual-clutch transmission, second embodiment
2 Driveshaft
3 Dual-clutch assembly
4 Clutch cage
5 First input shaft
6 Second input shaft
7 Drive input wheel of input constant E1
8 Drive output wheel of input constant E1
9 Drive input wheel of input constant E2
10 Drive output wheel of input constant E2
11 First countershaft
12 First section of countershaft 11
13 Second section of countershaft 11
14 Second countershaft
15 Fixed wheel of spur gear stage Z1
16 Loose wheel of spur gear stage Z1
17 Fixed wheel of spur gear stage Z2
18 Loose wheel of spur gear stage Z2
19 Fixed wheel of spur gear stage Z3
20 Loose wheel of spur gear stage Z3
21 Fixed wheel of spur gear stage Z4
22 Loose wheel of spur gear stage Z4
23 Fixed wheel of spur gear stage ZR
24 Intermediate wheel of spur gear stage ZR
25 Loose wheel of spur gear stage ZR
26 Output shaft
A Gear shifting element of spur gear stage Z1
B Gear shifting element of spur gear stage Z2
C Gear shifting element of spur gear stage Z3
D Gear shifting element of spur gear stage Z4
E Gear shifting element of spur gear stage ZR
E1 First input constant
E2 Second input constant
G1-G8 Forward gears
Gn n-th forward gear
Gn+1 (n+1)-th forward gear
Gear ratio
$i_{E1}$ Gear ratio of input constant E1
$i_{E2}$ Gear ratio of input constant E2
$i_{G1}$-$i_{G8}$ Gear ratios of the gears G1 to G8
$i_{Gn}$ Gear ratio of the n-th gear
$i_{Gn+1}$ Gear ratio of the (n+1)-th gear
$i_{Gn+2}$ Gear ratio of the (n+2)-th gear
$i_{R1}$ Gear ratio of reverse gear R1
$i_{R2}$ Gear ratio of reverse gear R2
$i_{Z1}$ Gear ratio of spur gear stage Z1
$i_{Z2}$ Gear ratio of spur gear stage Z2
$i_{Z3}$ Gear ratio of spur gear stage Z3
$i_{Z4}$ Gear ratio of spur gear stage Z4
$i_{ZR}$ Gear ratio of spur gear stage ZR
K1 First friction clutch
K2 Second friction clutch
L First coupling shifting element
M Second coupling shifting element
N Third coupling shifting element
O Fourth coupling shifting element
R1 First reverse gear
R2 Second reverse gear
S1 First double shifting element
S2 Second double shifting element
Z1 First spur gear stage
Z2 Second spur gear stage
Z3 Third spur gear stage
Z4 Fourth spur gear stage
ZR Reversing spur gear stage
φ Gear interval

The invention claimed is:

1. A dual-clutch transmission of a motor vehicle comprising:
a centrally arranged first input shaft (5) and a second input shaft (6) that is a hollow shaft being arranged coaxially over the first input shaft (5),
drive input sides of the first and the second input shafts (5, 6) each being connectable, via a respective friction clutch (K1, K2), to a driveshaft (2) of a drive engine,
a transmission side of the first and the second input shafts (5, 6) either being drivingly connected or drivingly connectable, via a respective first and second input constant (E1, E2) in each case comprising a drive input wheel (7, 9) and a drive output wheel (8, 10), to a respective one of first and second countershafts (11, 14),
the first and the second countershafts (11, 14) are each selectively drivingly connectable, by way of first, second, third, fourth and reversing spur gear stages (Z1, Z2, Z3, Z4, ZR), with an output shaft (26) that is arranged coaxially with and axially adjacent to the first input shaft (5), and each of the first, the second, the third and the fourth spur gear stages being shiftable by a respective gear shifting element (A, B, C, D, E),
the first countershaft (11) being a hollow shaft and being arranged coaxially around the second countershaft (14), the first countershaft (11) being divided into a first section (12), axially on a drive input side thereof, and a second section (13), axially on a drive output side thereof, which are connectable to one another in a rotationally fixed manner by a first coupling shifting element (L), the first, the second, the third and the fourth spur gear stages (Z1, Z2, Z3, Z4) engaging forward gears (G1, G2, G3, G4, G5, G6, G7, G8), each of the first, the second, the third and the fourth spur gear stages having a respective transmission ratio ($i_{Z1}$, $i_{Z2}$, $i_{Z3}$, $i_{Z4}$), the transmission ratio of the first spur gear stage being higher than the transmission ratio of the second spur gear stage which is higher than the transmission ratio of the third spur gear stage which is higher than the transmission ratio of the fourth spur gear stage ($i_{Z1} > i_{Z2} > i_{Z3} > i_{Z4}$), and the reversing spur gear stage (ZR) engaging reverse gears (R1, R2), the fourth spur gear stage (Z4) is arranged between the first section (12) of the first countershaft (11) and the output shaft (26), the second and the third spur gear stages (Z2, Z3) are arranged between the second section (13) of the first countershaft (11) and the output shaft (26), and the first spur gear stage (Z1) and the reversing spur gear stage (ZR) are arranged between the second countershaft (14) and the output shaft (26), the first input constant (E1) having a higher transmission ratio compared with a transmission ratio of the second input constant (E2), the drive output wheel (8) of the first input constant (E1) being a loose wheel, which is mounted to rotate on the second countershaft (14) and being connectable, in a rotationally fixed manner, to the first section (12) of the first countershaft (11) by a second coupling shifting element (M), and a third coupling shifting element (N) connects, in a rotationally fixed manner, the second section (13) of the first countershaft (11) to the second countershaft (14).

2. The dual-clutch transmission according to claim 1, wherein the first and the second input constants (E1, E2) have a transmission ratio gradation ($i_{E1}/i_{E2}$) of such a value, and the first, the second, the third and the fourth spur gear stages (Z1, Z2, Z3, Z4) have a progressive transmission ratio gradation ($i_{Z1}/i_{Z2} > i_{Z2}/i_{Z3} > i_{Z3}/i_{Z4}$) in such manner that:

first, second, third and fourth gears (G1, G2, G3, G4) are engaged in alternation in a force flow that passes via either the first or the second input constant (E1, E2) and successively in pairs via either the first or the second spur gear stage (Z1, Z2), a fifth gear (G5) is engaged in a force flow via the first input constant (E1) and the fourth spur gear stage (Z4), a sixth gear (G6) is engaged in a force flow via the second input constant (E2) and the third spur gear stage (Z3), and a highest gear (G8) is engaged in a force flow via the second input constant (E2) and the fourth spur gear stage (Z4).

3. The dual-clutch transmission according to claim 2, wherein the transmission ratios ($i_{E1}$, $i_{E2}$, $i_{Z1}$, $i_{Z2}$, $i_{Z3}$, $i_{Z4}$) of the first and the second input constants (E1, E2) and the first, the second, the third and the fourth spur gear stages (Z1, Z2, Z3, Z4) are selected such that:

a gear gradation between the first and the fourth gears (G1, G2, G3, G4) is substantially geometric ($i_{Gn}/i_{Gn+1}$=constant), and a gear graduation between the third and the sixth gears (G3, G4, G5, G6) is substantially progressive ($i_{G3}/i_{G4} > i_{G4}/i_{G5} > i_{G5}/i_{G6}$), and a gear graduation between the fifth gear and the highest gear (G5, G8) is substantially geometric ($i_{Gn}/i_{Gn+1}$=constant).

4. The dual-clutch transmission according to claim 2, wherein the transmission ratios ($i_{E1}$, $i_{E2}$, $i_{Z1}$, $i_{Z2}$, $i_{Z3}$, $i_{Z4}$) of the first and the second input constants (E1, E2) and the first, the second, the third and the fourth spur gear stages (Z1, Z2, Z3, Z4) are selected such that:

a gear gradation between the first and the fourth gears (G1, G2, G3, G4) is substantially geometric (iGn/iGn+1=constant), and a gear graduation between the third gear and the highest gear (G3, G8) is substantially progressive (iGn/iGn+1>iGn+1/iGn+2).

5. The dual-clutch transmission according to claim 1, wherein the first input shaft (5) is rotationally fixedly connectable to the output shaft (26) by a fourth coupling shifting element (O).

6. The dual-clutch transmission according to claim 5, wherein the transmission ratios ($i_{E1}$, $i_{E2}$, $i_{Z1}$, $i_{Z2}$, $i_{Z3}$, $i_{Z4}$) of the first and the second input constants (E1, E2) and the first, the second, the third and the fourth spur gear stages (Z1, Z2, Z3, Z4) are selected such that:

a direct gear (G7) that can be engaged by the fourth coupling shifting element (O) has a lower transmission ratio than a sixth gear (G6) and a higher transmission ratio than a highest gear (G8), and the direct gear (G7), with either substantially geometric gear gradation ($i_{G6}/i_{G7} = i_{G7}/i_{G8}$) or with substantially progressive gear gradation ($i_{G6}/i_{G7} > i_{G7}/i_{G8}$), is sequenced between the sixth gear (G6) and the highest gear (G8).

7. The dual-clutch transmission according to claim 1, wherein loose wheels (18, 20), of the second and the third spur gear stages (Z2, Z3), are arranged together either on the output shaft (26) or on the second section (13) of the first countershaft (11), and the gear shifting elements (B, C), of the second and the third spur gear stages (Z2, Z3), are combined in a double shifting element (S1).

8. The dual-clutch transmission according to claim 1, wherein loose wheels (16, 25), of the first spur gear stage (Z1) and of the reversing spur gear stage (ZR), are arranged together either on the output shaft (26) or on the second countershaft (14), and the gear shifting elements (A, E), of the first spur gear stage (Z1) and of the reversing spur gear stage (ZR), are combined in a double shifting element (S2).

9. A dual-clutch transmission of a motor vehicle comprising:

first and second input shafts, the second input shaft being a hollow shaft and the first input shaft being coaxial with and extending through the second input shaft;

an input side of the first input shaft being connectable, via a first friction clutch, to a driveshaft of a drive engine, and an input side of the second input shaft being connectable, via a second friction clutch, to the driveshaft of the drive engine;

a transmission side of the first input shaft being fixedly connected with a first countershaft via a first input constant which comprises a drive input wheel and a drive output wheel, the first countershaft being selectively drivingly connectable with an output shaft by a plurality of spur gear stages which are engagable by respective gear shifting elements, and the output shaft being coaxially aligned with and axially spaced from the first input shaft;

a transmission side of the second input shaft being connectable with a second countershaft via a second input constant which comprises a drive input wheel and a drive output wheel, the second countershaft being selectively drivingly connectable with the output shaft by the plurality of spur gear stages which are engagable by the respective gear shifting elements, and the first countershaft being a hollow shaft and the second countershaft being coaxial with and extending through the first countershaft;

the first countershaft having a first axial section on an input side thereof and a second axial section on a drive output side thereof, the first and the second sections of the first countershaft are independent from one another and rigidly connectable to one another via a first coupling shifting element;

the plurality of spur gear stages comprise first, second, third and fourth spur gear stages which engage forward gears and a reverse spur gear stage which engages reverse gears, the first spur gear stage having a transmission ratio, the second spur gear stage having a transmission ratio that is lower than the transmission ratio of the first spur gear stage, the third spur gear stage having a transmission ratio that is lower than the transmission ratio of the second spur gear stage, and the fourth spur gear stage having a transmission ratio that is lower than the transmission ratio of the third spur gear stage;

the fourth spur gear stage being arranged to facilitate coupling of the first axial section of the first countershaft to the output shaft, the second and the third spur gear stages being arranged to facilitate coupling the second axial section of the first countershaft to the output shaft, and the first spur gear stage and the reversing spur gear stage being arranged to facilitate coupling the second countershaft to the output shaft;

the first input constant having a higher transmission ratio than a transmission ratio of the second input constant;

the drive output wheel of the first input constant being a loose wheel and being supported by the second countershaft so as to rotate with respect to the second countershaft, and the drive output wheel of the first input constant being connectable, via a second coupling shifting element, to the first section of the first countershaft so as to prevent relative rotation therebetween; and the second section of the first countershaft being connectable, via a third coupling shifting element, to the second countershaft so as to prevent relative rotation therebetween.

* * * * *